(12) United States Patent
Jung et al.

(10) Patent No.: US 6,877,436 B2
(45) Date of Patent: Apr. 12, 2005

(54) GAS GENERATOR

(75) Inventors: Christian Jung, St. Wendel (DE); Thomas Kapfelsperger, Mühldorf (DE); Maximilian Bergmann, Mühldorf (DE); Achim Hofmann, Polling (DE)

(73) Assignee: TRW Airbag Systems GmbH, Aschau Inn (DE)

( * ) Notice: Subject to any disclaimer, the term of this patent is extended or adjusted under 35 U.S.C. 154(b) by 0 days.

(21) Appl. No.: 10/648,074

(22) Filed: Aug. 26, 2003

(65) Prior Publication Data
US 2004/0041380 A1 Mar. 4, 2004

(30) Foreign Application Priority Data
Aug. 29, 2002 (DE) ......................................... 102 39 778

(51) Int. Cl.[7] ............................................... C06D 5/02
(52) U.S. Cl. ...................................................... 102/530
(58) Field of Search ........................... 102/530; 280/730

(56) References Cited

U.S. PATENT DOCUMENTS

| | | | | |
|---|---|---|---|---|
| 4,083,187 A | * | 4/1978 | Nagashima | ................... 60/407 |
| 5,301,979 A | * | 4/1994 | Allard | ......................... 280/737 |
| 5,639,117 A | | 6/1997 | Mandzy et al. | |
| 5,683,105 A | | 11/1997 | Jackson | |

FOREIGN PATENT DOCUMENTS

| | | |
|---|---|---|
| DE | 19929046 | 1/2001 |
| DE | 10031750 | 1/2002 |
| DE | 10062090 | 6/2002 |
| EP | 0788942 | 8/1997 |

* cited by examiner

Primary Examiner—Teri Pham Luu
Assistant Examiner—Bret Hayes
(74) Attorney, Agent, or Firm—Tarolli, Sundheim, Covell & Tummino L.L.P.

(57) ABSTRACT

A gas generator comprises a container (12) filled with a pressurized fluid (14) and having an outflow opening (16), and a piston (20; 120) which is displaceably arranged in the container (12). The piston has a shutter opening (22; 122) dividing the container (12) into a first chamber (24) and a second chamber (26), the first and second chambers (24, 26) being filled with the fluid (14). The piston (20; 120) on activation of the gas generator (10; 100) and when the outflow opening (16) has been opened, is moved by a pressure prevailing in the second chamber (26) from a predetermined initial position (AP) in the direction towards the outflow opening (16) into an end position (EP) in which the end volume of the first chamber (24) is significantly reduced compared with the start volume of the first chamber (24). There is also proposed a method of operating such gas generator.

19 Claims, 3 Drawing Sheets

GAS GENERATOR

TECHNICAL FIELD

The invention relates to a gas generator.

BACKGROUND OF THE INVENTION

A gas generator with a container, which is filled with a pressurized fluid and has an outflow opening, is usually denoted as a cold gas generator, in which the filling gas intended for inflating a gas bag is stored in compressed form in a container for compressed gas. As filling gas, principally inert gases such as argon or helium are used. Compared with solid propellant generators, this type of gas generator offers the advantage that the generated gas is particle-free and, in addition, compared with a pyrotechnic gas generator, it arrives into the gas bag with a distinctly lower temperature. Of course, in cold gas generators it is considerably more costly to realize an outflow behavior of the gas from the gas generator which is adapted to the respective installation situation.

It is known that the outflow behavior can be influenced through equipping the pressure container with a shutter having a small shutter opening. The maximum in the mass flow of the emerging gas is all the less, the smaller the volume in the chamber formed between shutter and outflow opening, and the smaller the shutter opening is itself. A reduction of the emerging quantity of gas by reduction of the chamber volume with a given pressure in the container is therefore always accompanied by a reduction of the maximum in the mass flow. However, this maximum must not fall below a certain value, because this so-called initial strike must provide a sufficiently high force in order, for example, to press open a covering of a gas bag module or to ensure an initial unfolding of a gas bag. Therefore, close limits are set for the variation of the outflow behavior. The fixed arrangement of a shutter in a compressed gas container is, in addition, relatively costly.

It is an object of the invention to make possible in a simple manner a variation of the outflow behavior of the gas from a gas generator.

BRIEF SUMMARY OF THE INVENTION

According to the invention, a gas generator comprises a container filled with a pressurized fluid and having an outflow opening, and a piston which is displaceably arranged in the container. The piston has a shutter opening dividing the container into a first chamber and a second chamber, the first and second chambers being filled with the fluid. The piston on activation of the gas generator and when the outflow opening has been opened, is moved by a pressure prevailing in the second chamber from a predetermined initial position in the direction towards the outflow opening into an end position in which the end volume of the first chamber is significantly reduced compared with the start volume of the first chamber. When the gas stored in the first chamber, lying between the piston and the outflow opening, flows out, the pressure prevailing in the second chamber pushes the piston from the initial position in the direction towards the outflow opening into its end position. Through the volume reduction of the first chamber, which is caused by the movement of the piston, the gas still remaining in the first chamber is compressed, whereby the pressure in the first chamber decreases distinctly more slowly than in the case of a comparable size of the first chamber with a fixed shutter. The slowing down of the pressure drop in the first chamber has an effect on the mass flow of the filling gas. The initial maximum in the mass flow is only negligibly lower than in the case where no shutter is provided in the container, i.e. the entire gas stored in the container emerges unimpeded. The relevant quantity of gas emerging (i.e. the quantity contributing to the filling of a gas bag) can be accordingly adjusted very precisely, possibly even continuously, through the selection of the initial position of the piston and the size of the shutter opening. The alteration of the mass flow over time can likewise be simply predetermined by the selection of the size of the shutter opening. As the piston does not have to be fixedly welded in place, the use of a standard pressure container is possible. The latter can be adapted simply and quickly to various installation situations, e.g. various vehicle types, for an outflow behavior which is optimized in each case. As the initial strike is practically independent of the initial position of the piston, it is always ensured that sufficient energy is made available in order for example to press open a covering.

The gas volume displaced between the initial position and end position of the piston in the first chamber must of course be sufficient to bring about the minimum level of the maximum of the mass flow. The start volume of the first chamber therefore preferably amounts to between $2/7$ and half the total volume of the compressed gas container, and with the movement between initial position and end position of the piston, the start volume of the first chamber is preferably reduced by at least 50%, particularly preferably by at least 90%.

The piston is preferably fixed by springs in the initial position, preferably two springs being provided operating in opposition, one of which is arranged in the first chamber and one in the second chamber and which clamp the piston between them. However, it is also possible to operate with a different number of springs.

Advantageously, spiral springs can be used as springs. The spring rate of the springs is preferably on the one hand selected to be so high that they hold the piston in position in the case of external accelerations (e.g. by movements of the vehicle), but on the other hand so low that a braking effect of the springs on the piston on activation of the gas generator can be disregarded. However, it is also conceivable to design one or more of the springs such that they significantly damp the movement of the piston to the end position, in order to thus obtain a further parameter for influencing the outflow characteristic.

The initial position of the piston and hence the start volume of the first chamber is fixed or constant. It represents the position of equilibrium of the piston between the springs. Before activation of the gas generator, the position of the piston possibly varies slightly and negligibly with respect to this initial position, e.g. by accelerations of the vehicle, which result in a brief weak deflection of the springs, or by the (negligible) thermal expansion of the components involved. For all practical considerations, the start volume of the first chamber can be regarded as constant.

Preferably the piston consists of plastic. It is possible to use springs consisting of plastic. The manufacture of these components from plastic means that the gas generator is only negligibly heavier than a conventional gas generator.

In order to obtain a further variation possibility, the shutter opening can be closed by a bursting membrane before the activation of the gas generator. Preferably, the bursting membrane is designed such that it is opened by the pressure in the second chamber not until the piston has reached its end position. In this case, the pressure prevailing in the second chamber is not reduced by the outflow of gas. After reaching the end position of the piston, the gas flowing out from the second chamber, dependent on the cross-section of the shutter opening, can either contribute to the filling of the gas bag or can escape for the auto-deactivation of the gas generator.

In another embodiment of the invention, provision is made that at least two pistons, coupled by springs, are provided in the container. This arrangement additionally increases the variability of the outflow behavior. The pressure in the chamber furthest to the rear moves the piston adjoining thereto, the pressure in the chamber adjoining this piston moves the next piston etc., until all the pistons have reached their respective end position.

Each of the pistons can have a shutter opening with an optimized cross-section; the shutter openings can all be closed by a bursting membrane.

Preferably, all the shutter openings have a smaller cross-section than the outflow opening, in order to decelerate the outflow of the gas from the second or also from further chambers.

According to another preferred embodiment of the invention, a diffusor is provided in the container, which defines an outflow space situated in the container; the diffusor has at least one first and one second through-flow opening arranged at different axial positions, and the shutter opening encompassing the diffusor. Preferably, in the end position of the piston, the second through-flow opening is opened and the first through-flow opening is closed by the piston. In addition to the pressure rise in the first chamber through the movement of the piston, this variant allows the effective size of the outflow opening to be adjusted as a function of the current position of the piston.

The second through-flow opening preferably has a smaller cross-section than the first through-flow opening, so that the emergence of gas from the second chamber takes place more slowly than from the first.

The travel of the piston as far as to the end position reaches its maximum value if there is no additional stop in the interior of the container, but rather if it either pushes the spring in the first chamber to block or hits the end wall of the container.

The invention additionally relates to a method of operating a gas generator comprising a container filled with a pressurized fluid and having an outflow opening, and a piston which is displaceably arranged in the container and divides the container into a first and a second chamber, both chambers being filled with the fluid. For this, in a first step, the outflow opening is opened, and in a second step the piston moves from a predetermined initial position in the direction towards the outflow opening into an end position, so that it assists the fluid in the first chamber in escaping, the movement of the piston significantly reducing the start volume of the first chamber. The piston here does not serve, as is known from prior art, to open the outflow opening, but rather it only moves when the exposure of the outflow opening makes possible an outflow of the gas from the first chamber. As explained above, the movement of the piston leads to the maximum of the mass flow only being negligibly reduced compared with a maximum which would be obtained if the entire gas from both chambers were to escape through the outflow opening.

Preferably, the outflow opening is opened by a mechanism arranged outside the pressure container. However, it is also possible to construct the compressed gas container such that the outflow opening is opened from the inside. The movement of the piston, however, is preferably not used for opening the outflow opening.

DETAILED DESCRIPTION OF THE PREFERRED EMBODIMENTS

Figure 1:
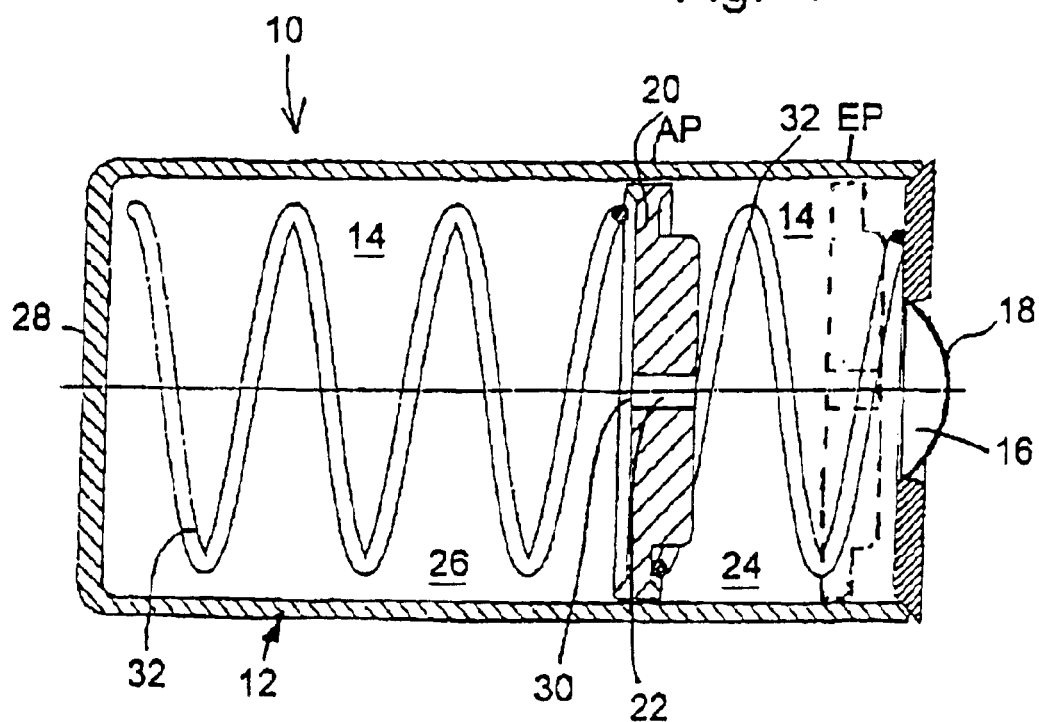
FIG. 1 shows a diagrammatic section through a gas generator of the invention, in accordance with a first embodiment.

In FIG. 1, there is shown a gas generator 10 according to a first embodiment of the invention. The gas generator 10 comprises a compressed gas container 12, which is filled with pressurized fluid 14, preferably an inert gas such as argon or helium. At one end, the compressed gas container 12 has an outflow opening 16, which before activation of the gas generator 10 is closed by a bursting membrane 18. The gas generator 10 additionally comprises a mechanism, arranged outside or inside the container and provided for opening the bursting membrane 18; this mechanism is formed in a known manner and is not illustrated here.

Arranged in the compressed gas container 12 is a displaceable piston 20 which has a shutter opening 22. The piston 20 divides the compressed gas container 12 into a first chamber 24, which extends between the piston and the outflow opening 16, and a second chamber 26, which extends between the piston and a rear wall 28 of the container. Both chambers 24, 26 are filled with the fluid 14. Before activation of the gas generator, the shutter opening 22 can be closed by a further bursting membrane 30. The bursting membrane can also be omitted, so that there will be an equalization of pressures.

Before activation of the gas generator 10, the piston 20 can be held in a predetermined initial position AP (shown by continuous lines in all the figures) by two springs 32 acting in opposition. One of the springs 32 is arranged in the first chamber 24, the other in the second chamber 26. The springs 32, which in these examples are spiral springs, are dimensioned such that their spring rate is great enough to counteract a displacement of the piston 20 away from the initial position, e.g. in the case of external accelerations, which are transferred to the gas generator 10 from the vehicle, for instance. However, the spring rate is selected to be so low that a movement of the piston 20 on activation of the gas generator 10 is not appreciably impeded. In the initial position AP, the piston 20 is not fastened to the cylindrical container wall.

The piston 20 and the springs 32 preferably consist of a suitable plastic.

The piston 20 could also be fixed detachably in the initial position in another way, e.g. by a notch or by an adhesive.

With an activation of the gas generator 10, firstly the bursting membrane 18 over the outflow opening 16 is opened by the mechanism which is not shown. As a consequence, the pressurized gas contained in the first chamber 24, flows out through the outflow opening 16, e.g. into a gas bag, which is not shown. This outflow is represented in a flow-time diagram as a maximum in the mass flow, the so-called initial strike. The reduction of the pressure in the first chamber 24 through the outflow of the gas contained therein results in a pressure difference between the second chamber 26 and the first chamber 24. In the second chamber 26, at this moment a pressure prevails which is only negligibly reduced compared with a pressure $P_0$ before the opening of the bursting membrane 18. This pressure acts on the movable piston 20 and pushes the latter in the direction towards the outflow opening 16. The movement of the piston 20 has the result that the pressure in the first chamber 24 falls more slowly than would be the case without the movement of the piston 20, because the gas which is still in the chamber 24 is compressed. The increased pressure in the chamber 24 has the effect that the gas contained in the first chamber 24 flows out at a higher mass flow than would be the case with a fixed shutter. All this leads to the initial strike being scarcely reduced compared with a container without a shutter, in which the entire gas volume of the chambers 24, 26 flows out.

The piston 20 comes to rest in an end position EP, which is indicated in FIG. 1 by dashed lines. The volume of the first chamber 24 has been significantly reduced by the movement of the piston 20 from the initial position AP into the end position EP, preferably by more than 90%, but at least by approximately 50%. The initial volume of the chamber 24, and with this the quantity of gas initially stored in the chamber 24, is selected to be so great that it is sufficient for opening a covering of a gas bag module or for filling a gas bag up to a predetermined desired amount. For this, the volume of the first chamber 24 preferably amounts to between 2/7 and half the total volume of the pressure container 12.

When the piston 20 has taken up the end position EP, the pressure in the second chamber 26, which is still high and acts on the now stationary piston 20, causes a bursting of the bursting membrane 30 closing the shutter opening 22 in the piston 20. From this moment, the gas now can flow out through the outflow opening 16 from the second chamber 26.

The cross-section of the shutter opening 22 is selected according to the requirements, e.g. adapted to the installation situation of the gas generator. Preferably, the shutter opening 22 always has a smaller cross-section than the outflow opening 16. This leads to the outflow of the gas from the second chamber 26 in any case taking place more slowly than the outflow of the gas from the first chamber 24. Depending on the size of the cross-section of the shutter opening 22, the gas from the second chamber 26 contributes to the inflation of the gas bag or to the extension of its service life, or the gas flows out from the chamber 26 with such a small mass flow that it does not contribute in a relevant manner to the inflation behavior of the gas bag. In this case however, the shutter opening 22 provides for that no quantities of gas remain behind in the gas generator 10.

Through the selection of the initial position AP, the volume of the first chamber 24, the ratio of the volumes of the first chamber 24 and of the second chamber 26, the cross-section of the shutter opening 22, and also dependent on the presence and construction of the bursting membrane 30, the outflow behavior of the gas generator 10 can be established precisely and in a very broad scope by means of simple parameters which can be altered easily. A standardized compressed gas container 12 can therefore be used in a gas generator which has an optimized outflow behavior for the respective installation situation.

It is also possible to use the spring rate of the springs 32 as a further optimization parameter.

Figure 2:
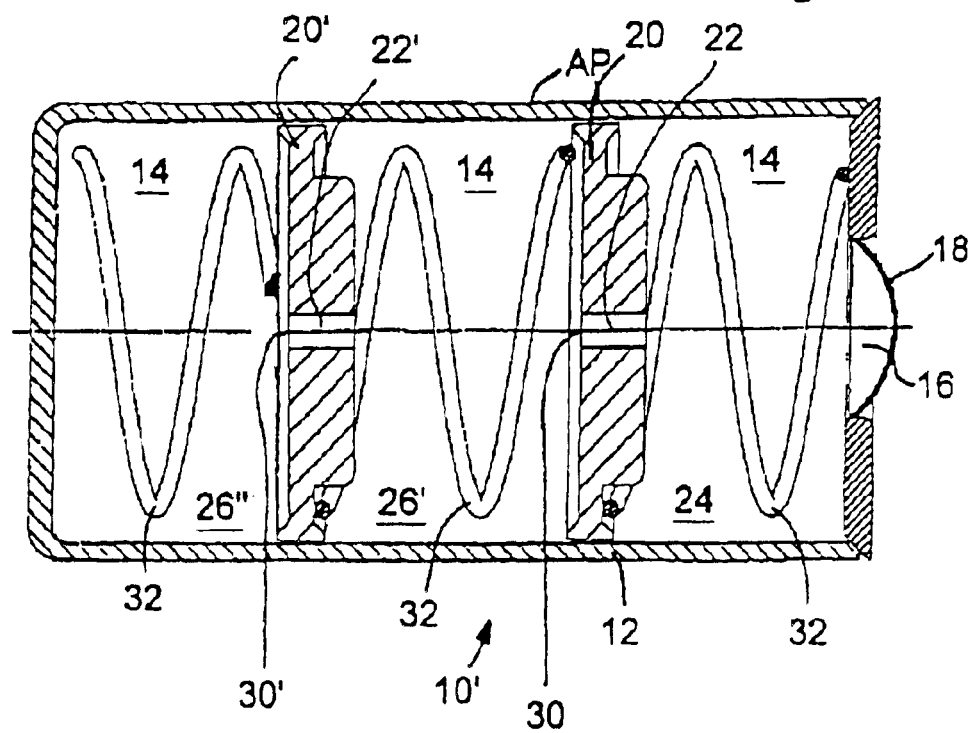
FIG. 2 shows a diagrammatic section through a gas generator of the invention, in accordance with a second embodiment.

The gas generator 10' illustrated in FIG. 2 differs from the one shown in FIG. 1 in that in addition to the piston 20, a second piston 20' is provided, which divides the second chamber once again, so that as a whole three chambers 24, 26' and 26" are formed. After the opening of the bursting membrane 18 and the exposure of the outflow opening 16 taking place thereby, the pressure prevailing in the chambers 26', 26" moves the first piston 20 from the initial position AP into the end position EP (not illustrated here, but analogous to the one shown in FIG. 1), the gas contained in the first chamber 24 flowing out from the gas generator 10 through the outflow opening 16. Then the bursting membrane 30 of the first piston 20 bursts, whereby the gas contained in the chamber 26' can likewise flow out, with reduced flow which is determined by the cross-section of the shutter opening 22 of the first piston 20. This outflow is brought about by the movement of the piston 20', supported by the pressure still prevailing in the third chamber 26". The piston 20' is hereby likewise moved into an end position. Now, the bursting membrane 30' in the second piston 20' can also burst, so that also the gas still contained in the third chamber 26" can leave the gas generator 10'. The shutter openings 22, 22' can have different cross-sections. Likewise, the spring rates of the springs 32 can be selected individually, in order to make possible a further variation of the outflow behavior. It is also possible to provide more than two pistons.

Figure 3:
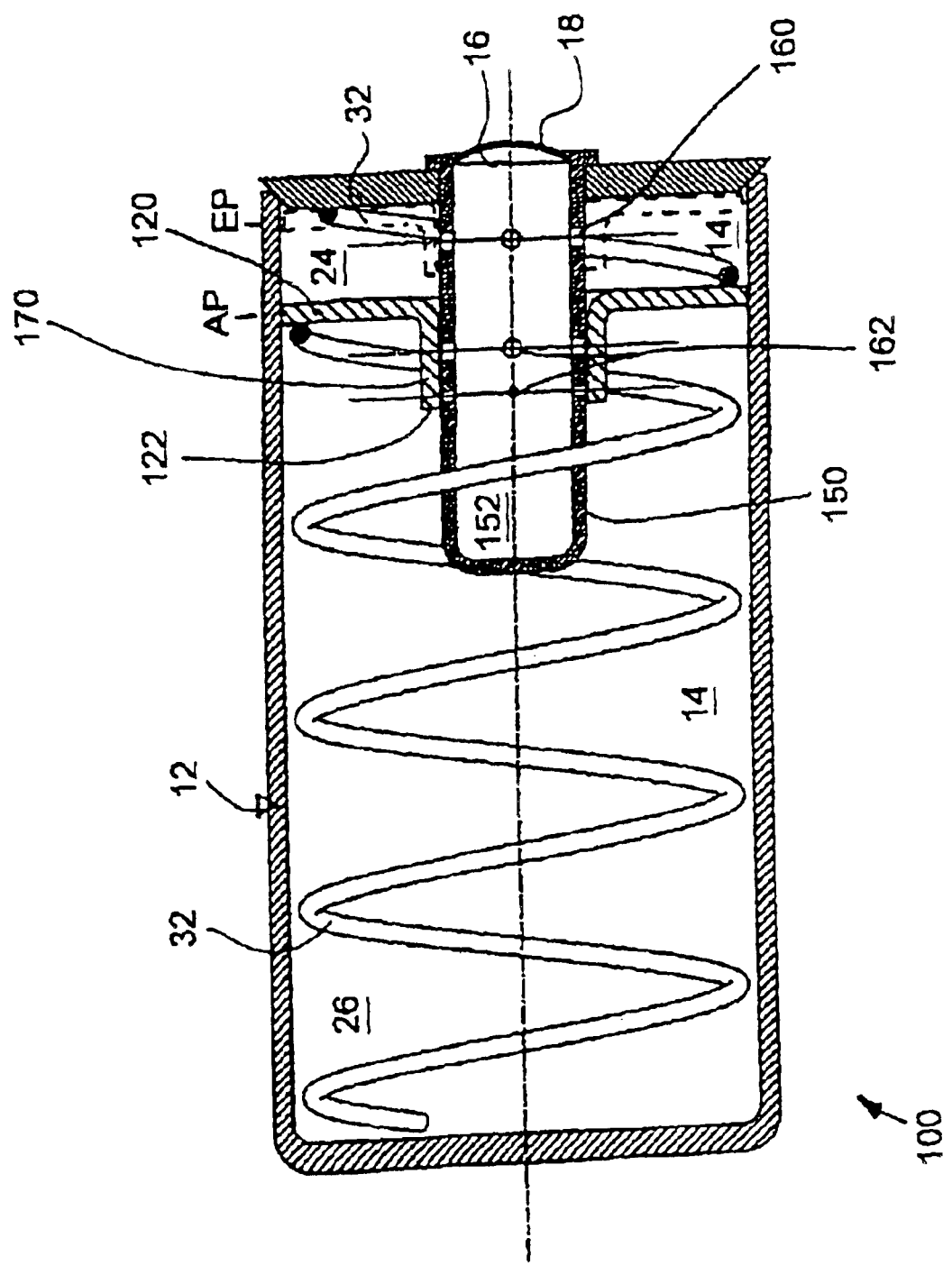
FIG. 3 shows a diagrammatic section through a gas generator of the invention, in accordance with a third embodiment of the invention.

A third embodiment of the invention is illustrated in FIG. 3. The gas generator 100 shown here likewise has a compressed gas container 12 with an outflow opening 16, which is closed by a bursting membrane 18 until the activation of the gas generator. In analogous manner to the first embodiment, the pressure container 12 is divided into a first chamber 24 and second chamber 26 by a piston 120 which is displaceably arranged in the container. Here, also, the two chambers 24, 26 are filled with a fluid 14. In an analogous manner to the first embodiment, springs 32 are provided in the chambers 24, 26, which fix the piston 120 at the predetermined initial position before activation of the gas generator 100.

Adjoining the outflow opening 16, a diffusor 150 extends inside the container, which diffusor 150 surrounds an outlet space 152, which extends through both chambers 26, 28. The diffusor 150 extends through the shutter opening 122 of the piston 120, creating an at least approximately gas-tight connection. For this, a conventional sealing means can be provided on the piston 120.

The diffusor 150 has first and second through-flow openings 160, 162. The through-flow openings are provided at different axial positions on the diffusor 150. In the example shown here, the first through-flow openings 160 are arranged closer to the outflow opening 16 than the second through-flow openings 162. Further outflow openings can also be provided at other axial positions.

The piston 120 has a lengthened ring extension 170 around the shutter opening 122, which is arranged such that in the initial position AP which is shown, it firstly closes the second through-flow openings 162, whilst the first through-flow openings 160 are left open. On activation of the gas generator, therefore, after the outflow opening 16 having been opened, the gas situated in the first chamber 24 can escape from the gas generator 100 through the first through-flow openings 160.

As soon as the gas escapes from the first chamber 24, the piston 120 is moved in the direction towards its end position EP by the pressure prevailing in the second chamber 26. Hereby, the first through-flow openings 160 are covered by the piston 120, in fact by its extension 170, whilst the second through-flow openings 162 are opened. The second through-flow openings 162 have a smaller overall cross-section than the first through-flow openings 160. In this way, the gas flow can be varied during the outflow.

The springs in the chambers 26, 26', 26" which are subsequently to be emptied may possibly assist the displacement of the piston(s). This is possible when their springs have a greater spring rate than the spring in the chamber 24 or when in the non-activated state a higher pressure prevails in the chamber 24 than in the chambers 26, 26', 26".

Figure 4:
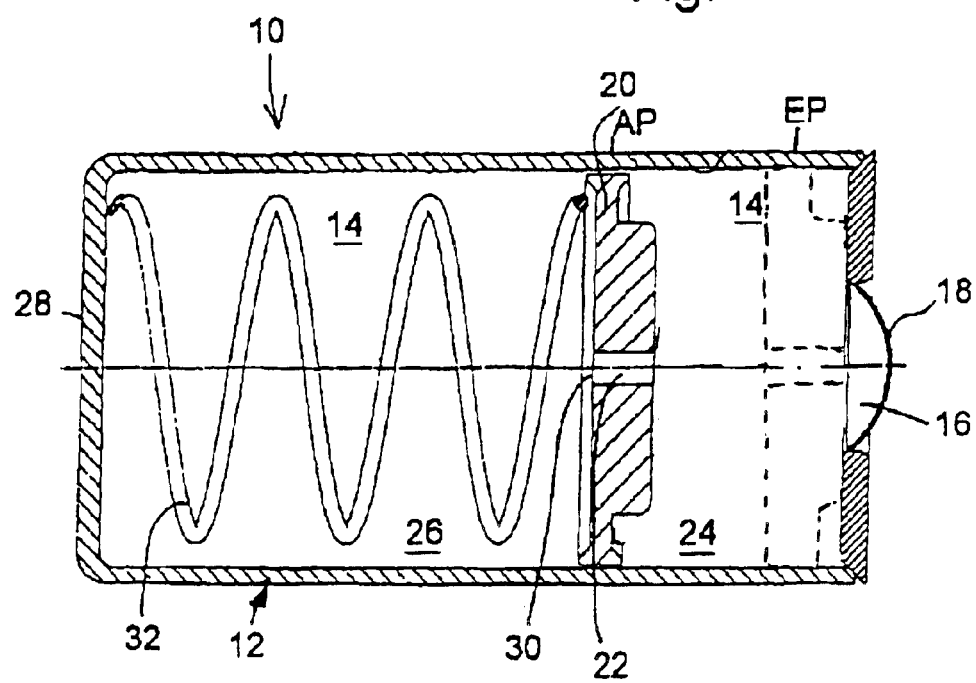
FIG. 4 shows a diagrammatic section through a gas generator of the invention, in accordance with a fourth embodiment.
Figure 5:
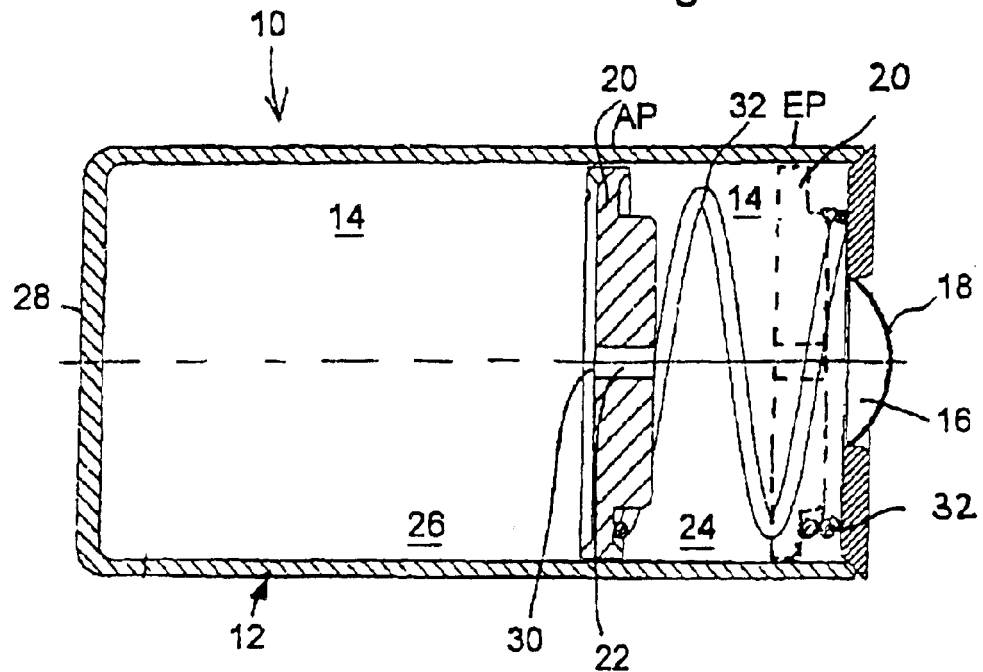
FIG. 5 shows a diagrammatic section through a gas generator of the invention, in accordance with a fifth embodiment.

The embodiments according to FIGS. 4 and 5 are similar to those of FIG. 1, but in FIG. 4 there is no spring in the first chamber 24 and in FIG. 5 there is no spring in the second chamber 26. A compact design can be achieved if the length of the travel path of the piston 20 has is maximized, i.e. that no separate axial stop is provided. In the embodiment according to FIG. 4 the piston 20 in the end position EP hits an end wall 50 of container 12, whereas according to FIG. 5 the spring 32 is pushed to block by piston 20.

The end wall being hit by the piston is also possible with the construction of FIG. 3, of course.

What is claimed is:

1. A gas generator comprising a container (12) filled with a highly pressurized fluid (14) in a non-activated state and having an outflow opening (16) closed in said non-activated state, and
   a piston (20; 120) which is displaceably arranged in said container (12) and has a shutter opening (22; 122) dividing said container (12) into a first chamber (24) and a second chamber (26), said first and second chambers (24, 26) being filled with said fluid (14),
   said piston (20; 120) on activation of said gas generator (10; 100) and when said outflow opening (16) has been opened, being moved by a pressure prevailing in said second chamber (26) from a predetermined initial position (AP) in a direction towards said outflow opening (16) into an end position (EP) in which a volume of said first chamber (24) is significantly reduced compared with a start volume of said first chamber (24).

2. The gas generator according to claim 1, characterized in that said end volume of said first chamber (24) in said end position (EP) of said piston (20; 120) is reduced by more than 50% compared with said start volume of said first chamber (24) in said initial position (AP) of said piston (20; 120).

3. The gas generator according to claim 1, characterized in that said piston (20; 20'; 120) consists of plastic.

4. The gas generator according to claim 1, characterized in that said piston (20; 20'; 120) is fixed in said initial position (AP) by at least one spring (32).

5. The gas generator according to claim 4, characterized in that said at least one spring (32) is provided in said first chamber (24).

6. The gas generator according to claim 4, characterized in that said at least one spring (32) is provided in said second chamber (26).

7. The gas generator according to claim 4, characterized in that said at least one spring (32) consists of plastic.

8. The gas generator according to claim 1, characterized in that said shutter opening (22; 22') is closed by a bursting membrane (30; 30') before said gas generator is activated.

9. The gas generator according to claim 1, characterized in that at least two pistons (20; 20'), coupled by at least one spring (32), are provided in said container (12).

10. The gas generator according to claim 1, characterized in that said shutter opening (22; 22') has a smaller cross-section than said outflow opening (16).

11. The gas generator according to claim 1, characterized in that in said container (12) a diffusor (150) is provided, which defines an outlet space (152) situated in said container (12),
   said diffusor (150) having at least one first and one second through-flow opening (160, 162) arranged at different axial positions and
   said diffusor (150) projecting into said shutter opening (122).

12. The gas generator according to claim 11, characterized in that in said end position (EP) said second through-flow opening (162) is opened, and said first through-flow opening (160) is closed by said piston (120, 170).

13. The gas generator according to claim 12, characterized in that said second through-flow opening (162) has a smaller cross-section than said first through-flow opening (160).

14. The gas generator according to claim 11, characterized in that said first through-flow opening in said initial position (AP) connects said outlet space (152) with said first chamber (24) and in said end position (EP) said second through-flow opening (162) connects said outlet space (152) with said second chamber (26).

15. The gas generator according to claim 1, characterized in that said at least one spring (32) is provided in said first chamber (24) and, in said end position (EP), is completely compressed by said piston (20).

16. The gas generator according to claim 1, characterized in that in said end position (EP) said piston (20) hits an end wall (50) of said container (12).

17. A method of operating a gas generator (10) comprising a container (12) filled with a pressurized fluid (14) and having an outflow opening (16), and a piston (20; 120) which is displaceably arranged in said container (12) and has a shutter opening (22; 122) dividing said container (12) into a first chamber (24) and a second chamber (26), said first and second chambers (24, 26) being activation of said gas generator (10; 100) and when said outflow opening (16) has been opened, being moved by a pressure prevailing in said second chamber (26) from a predetermined initial position (AP) in a direction towards said outflow opening (16) into an end position (EP) in which an end volume of said first chamber (24) is significantly reduced compared with a start volume of said first chamber (24), said method comprising the steps of:
   opening said outflow opening (16) in a first step, and
   moving said piston (20; 120) in a second step from a predetermined initial position (AP) in a direction towards said outflow opening (16) into an end position (EP), so that it assists said fluid (14) situated in said first chamber (24) in escaping, said movement of said piston (20; 120) significantly reducing said start volume of said first chamber (24).

18. The method according to claim 17, in which said piston (20; 120) has a shutter opening (22) which before activation of said gas generator (10) is closed by a bursting membrane (30) which only bursts when said piston (20) has taken up said end position (EP).

19. The method according to claim 17, in which said start volume of said first chamber (24) is reduced by at least 50% through said movement of said piston (20; 120) from said initial position (AP) into said end position (EP).

* * * * *

UNITED STATES PATENT AND TRADEMARK OFFICE
CERTIFICATE OF CORRECTION

PATENT NO. : 6,877,436 B2
DATED : April 12, 2005
INVENTOR(S) : Christian Jung et al.

It is certified that error appears in the above-identified patent and that said Letters Patent is hereby corrected as shown below:

<u>Column 8,</u>
Line 40, after "being" insert -- filled with said fluid (14), said piston (20;120) on --.

Signed and Sealed this

Twentieth Day of December, 2005

JON W. DUDAS
*Director of the United States Patent and Trademark Office*